May 12, 1931.   R. E. ELLIS   1,804,864
SHADE
Filed March 19, 1930
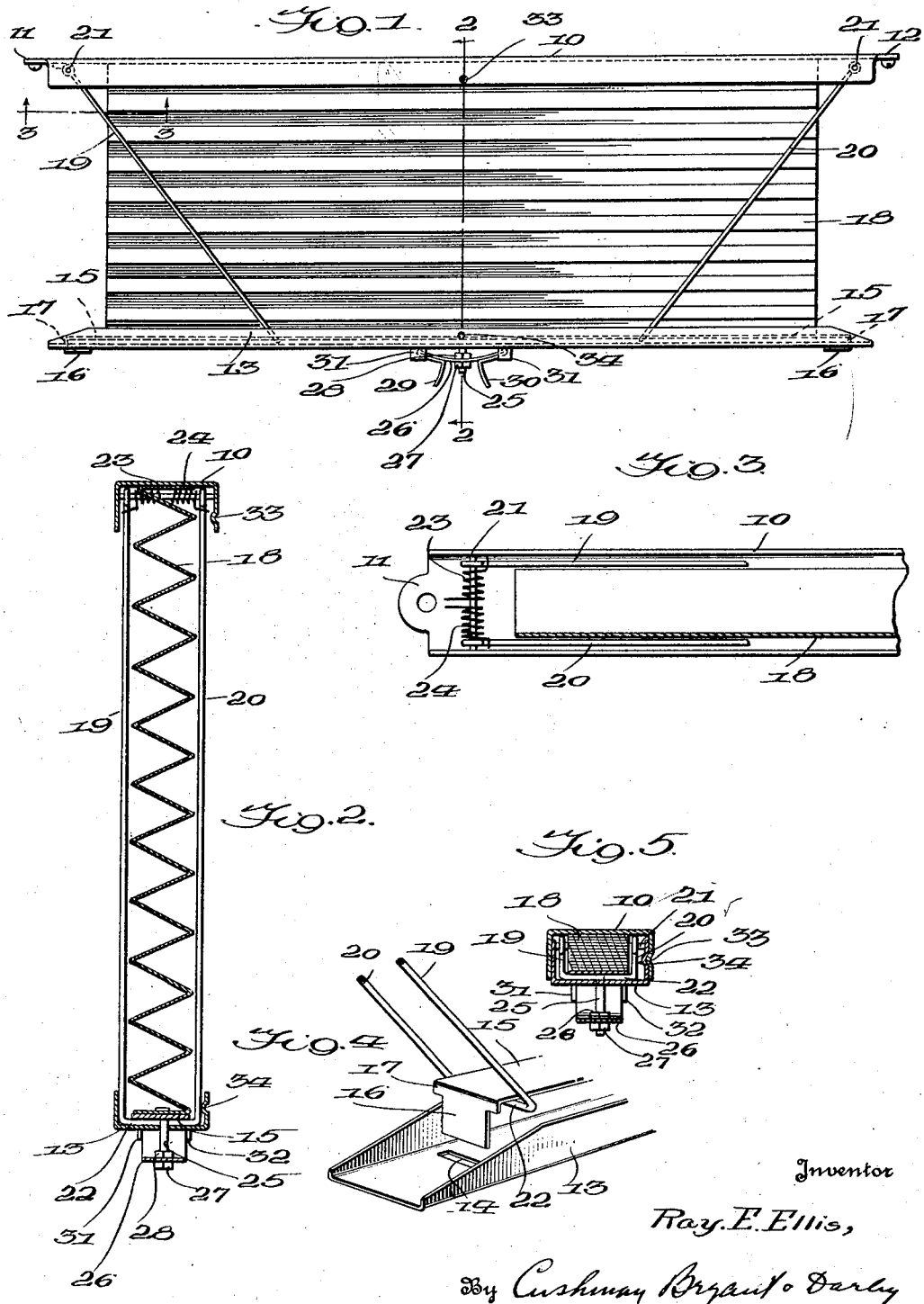
Inventor
Ray. E. Ellis,
By Cushman Bryant & Darby
Attorney Patented May 12, 1931

1,804,864

UNITED STATES PATENT OFFICE

RAY E. ELLIS, OF LOS ANGELES, CALIFORNIA

SHADE

Application filed March 19, 1930. Serial No. 437,125.

The present invention relates to shades comprising self-contained means for maintaining an extensible web portion in adjusted position, together with means for collapsing the web portion within a compact housing formed by frame members to which the web portion is attached. The shade according to the present invention may be made of any desired size and adapted to many uses. Due to its compactness, however, it is particularly applicable to association with automobile windshields in a manner to protect the eyes of the driver from direct rays of the sun or blinding headlight rays of approaching automobiles. If desired, a shade may be associated with a windshield at each side thereof to provide protection for driver and passenger alike.

The invention will be particularly described with reference to the accompanying drawings which illustrate one embodiment thereof. In the drawings:

Figure 1 is an elevation of the shade in extended position.

Figure 2 is a section on line 2—2 of Figure 1.

Figure 3 is a section on line 3—3 of Figure 1.

Figure 4 is an enlarged perspective of portions of certain elements in the process of assembly, and Figure 5 is a section on the same line as Figure 2 but with the shade collapsed.

Referring to the drawings, reference numeral 10 designates a channel bar of light material having at its longitudinal extremities projecting ears 11 and 12 perforated to receive screws by means of which the bar may be secured in desired position. In applying the shade to a windshield, as above discussed, the bar 10 will be secured to the usual ledge at the top and to the rear of the windshield and at the extreme left of the latter. In case no such ledge is present, angle brackets may be secured to the top of the windshield frame and the ears 11 and 12 fixed to these brackets. However, the means for mounting the shade are immaterial so far as the present invention is concerned, and any suitable means may be adopted.

A second channel bar 13, parallel and in face to face relation with the bar 10 is somewhat narrower than the latter so as to be received in the same with its side walls in overlapped relation. The bar 13 is provided adjacent its ends with transverse slots, one of which is indicated at 14, Figure 4. A strip 15 is provided at its ends with angular tongues as at 16, Figure 4, and shoulders as at 17. The tongues 16 are inserted in slots 14 with the shoulders 17 abutting the end margins of the slots and the tongues turned under, as indicated in Figure 1. Shoulders 17 serve to maintain the main portion of strip 15 in slightly spaced relation to the bottom of channel bar 13.

An extensible and preferably opaque web 18, here shown as being collapsible in superposed folds, accordion fashion, is secured at one end to bar 10 and at its other end to strip 15 by means of an adhesive, rivets, or in any other suitable manner, this web being collapsible or extensible as bar 13 is moved toward or away from bar 10.

Adjacent each end of bar 10 is pivoted a twin arm link, comprising arms 19 and 20, on a pin 21 mounted in and extending between the side walls of the channel bar. The other ends of the arms are connected by an integral angular portion 22 which is engaged between strip 15 and the bottom wall of bar 13. Web 18 is disposed between arms 19 and 20, the arms thus serving as guides for the web. Intermediate the arms on pins 21 are mounted torsion springs 23 and 24, these springs having ends engaging the arms and tending to swing the two links towards each other to bring bar 13 into overlapped relation with bar 10.

Engaged in a central perforation of strip 15 and having a shank extending through a registering perforation in the bottom wall of bar 13, is a headed pin 25 provided with screw threads at its projecting end. An arched spring clip 26 is provided centrally with a perforation in which the threaded end of pin 25 is engaged and held by nuts 27 and 28, the extremities of the clip reacting against the bottom surface of bar 13 so that tension is exerted on pin 25 with the result that strip 15 is urged toward bar 13 to clampingly engage the angular portions 22 of the links and thus prevent their displacement relative to the strip. The extremities of clip 26 are turned back and then outwardly to form grips 29 and 30 adapted to be manipulated by an operator in a compressing manner to flatten clip 26 and thus relieve the tension on pin 25 so that the angular portions of the links are released from their clamped engagement between the strip and bar. Upon such release springs 23 and 24, acting on the links, swing the latter inwardly towards each other, and angular portions 22 sliding under strip 15 tend to lift the latter and therewith bar 13 to the position shown in Figure 5, thereby collapsing web 18. The ends of clip 26 are guided between ears 31 and 32, struck from the bottom wall of bar 13. As most clearly shown in Figures 2 and 5, one of the side walls of bar 10 is provided with a protuberance 33 adapted to engage an indentation 34 in a side wall of bar 13 when the latter wall is overlapped by the former, as shown in Figure 5. The end portions of the side walls of bar 13 are tapered off, as shown, to prevent their interference with pins 21 when the shade is in completely collapsed position.

If it is desired to extend the shade, grips 29 and 30 are grasped and in pulling down, are naturally compressed to relieve the tension on pin 25, and thus permit the links to swing to the position shown in Figure 1, thus extending web 18. When grips 29 and 30 are released, tension is again exerted on pin 25 and the links are secured in position against the influence of springs 23 and 24. While I have spoken of parts 10 and 13 as being parallel, it will be understood that although this is their normal relation, they may, if it is desired, be made to assume an angular relation, and in the appended claims I have used the term "parallel" merely as a matter of convenience.

It is believed that the above description, considered with the drawing, will render the construction and operation of the shade entirely clear. It is to be understood, however, that I do not limit myself to the exact details of construction shown and described, and the showing is to be taken as illustrative and in no sense restrictive of the invention.

In the following claims, it is to be understood that the term "extensible web", unless otherwise qualified, is intended to cover any suitable web which may be made to accommodate itself to the movement of one of the frame bars toward or away from the other.

I claim:

1. In a device of the class described, a pair of channel bars in face to face relation, one of the bars being adapted to receive the other in overlapped relation therein, and a folding web having its ends secured within the channels of the bars, said web being extensible upon movement of the bars away from each other and being housed within the bar channels when the bars are brought together.

2. In a device of the class described, a pair of channels bars in face to face relation, one of the bars being adapted to receive the other in overlapped relation therein, a folding web having its ends secured within the channels of the bars, said web being extensible upon movement of the bars away from each other and being housed within the bar channels when the bars are brought together, and means for releasably securing the bars in overlapped relation.

3. In a device of the class described, a pair of bars in parallel relation, an extensible web connecting said bars, an arm connecting between said bars, and spring means acting on said arm and tending to bring the bars together.

4. In a device of the class described, a pair of bars in parallel relation, an extensible web connecting said bars, an arm pivotally connected to each end of one of the bars and slidably engaging the other bar, and spring means tending to swing the arms to bring the bars together.

5. In a device of the class described, a pair of bars in parallel relation, an extensible web connecting said bars, an arm pivotally connected to each end of one of the bars and slidably engaging the other bar, spring means tending to swing the arms to bring the bars together, means on said other bar engaging the slidable ends of the arms, and means for releasing said engaging means.

6. In a device of the class described, a pair of bars in parallel relation, an extensible web connecting said bars, an arm pivotally connected to each end of one of the bars and slidably engaging the other bar, spring means tending to swing the arms to bring the bars together, means on said other bar adapted to clampingly engage the slidable ends of the arms, spring means to effect such clamping engagement, and means for releasing such engagement.

7. In a device of the class described, a pair of bars in parallel relation, an extensible web connecting said bars, an arm pivotally connected to each end of one of the bars, a strip mounted on the other of said bars, said arms having angular end portions slidingly engaged between said strip and its associated bar, and means for clamping said strip against said angular portions to secure the latter against movement relative to the strip.

8. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, spring means for clamping said strip against said angular portions to secure the latter against movement relative to the strip, and means for releasing said spring means.

9. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, means for clamping said strip against said angular portions to secure the latter against movement relative to the strip, means for releasing said clamping means, and spring means tending to bring said bars together.

10. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, means for clamping said strip against said angular portions to secure the latter against movement relative to the strip, means for releasing said clamping means, and spring means acting through said arms to bring said bars together.

11. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, a pin engaging said strip and passed through an aperture in the associated bar, and a spring engaging said pin and reacting against said last named bar to clamp the strip against said angular portions.

12. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, a pin engaging said strip and passed through an aperture in the associated bar, an abutment on said pin beyond the bar, an arched spring clip interposed between said abutment and bar to clamp the strip against said angular portions, and means operable to flatten said clip and thus release the strip from clamping engagement with said end portions.

13. In a device of the class described, a pair of bars in parallel relation, an extensible web connecting said bars, an arm pivotally connected to each end of one of said bars, a strip mounted on the other of said bars, said arms having angular end portions slidingly engaged between said strip and its associated bar, a pin engaging said strip and passed through an aperture in the associated bar, an abutment on said pin beyond the bar, an arched spring clip interposed between said abutment and bar to clamp the strip against said angular portions, the arch of said clip bearing against said abutment, and grips on said clip at either side of the abutment compressible to flatten the clip and thus release the strip from clamping engagement with said end portions.

14. In a device of the class described, a pair of bars in parallel arrangement, an extensible web connecting said bars, means connecting said bars independently of the web, and means yieldingly influencing said last named means to bring the bars together.

15. In a device of the class described, a pair of bars in parallel arrangement, a web collapsible in superposed folds connecting said bars, means connecting said bars independently of the web, and means yieldingly influencing said last named means to bring the bars together and thus collapse the web.

16. In a device of the class described, a pair of bars in parallel arrangement, an extensible web connecting said bars, a twin-armed link pivotally connected at one end to each end of one of said bars with the web interposed between the arms thereof, and a sliding connection between the other end of each of said links and the other bar.

17. In a device of the class described, a pair of bars in parallel arrangement, an extensible web connecting said bars, a twin-armed link pivotally connected at one end to each end of one of said bars with the web interposed between the arms thereof, and a strip lying along the other bar with its ends secured to the latter, the other ends of the arms of each of said links being connected by an angular section slidably engaged between said strip and its associated bar.

18. In a device of the class described, a pair of bars in parallel arrangement, an extensible web connecting said bars, a twin-armed link pivotally connected at one end to each end of one of said bars with the web interposed between the arms thereof, a strip lying along the other bar with its ends secured to the latter, the other ends of the arms of each of said links being connected by an angular section slidably engaged between said strip and its associated bar, and clamping means centrally connecting said strip and its associated bar.

19. In a device of the class described, a pair of bars in parallel arrangement, an extensible web connecting said bars, a twin-armed link pivotally connected at one end to each end of one of said bars with the web interposed between the arms thereof, a strip lying along the other bar with its ends secured to the latter, the other ends of the arms of each of said links being connected by an angular section slidably engaged between said strip and its associated bar, and spring influenced clamping means centrally connecting said strip and its associated bar.

20. In a device of the class described, a pair of bars in parallel arrangement, an extensible web connecting said bars, a twin-armed link pivotally connected at one end to each end of one of said bars with the web interposed between the arms thereof, a sliding connection between the other end of each of said links and the other bar, and spring means tending to swing said links toward each other.

In testimony whereof I have hereunto set my hand.

RAY E. ELLIS.